United States Patent
Neo et al.

(10) Patent No.: US 9,536,112 B2
(45) Date of Patent: Jan. 3, 2017

(54) DELAYING OR DETERRING COUNTERFEITING AND/OR CLONING OF A COMPONENT

(75) Inventors: TeckKhim Neo, Singapore (SG); Paul I. Mikulan, Carrollton, TX (US); Murray J. Robinson, Corinth, TX (US); Rube M. Ross, Lucas, TX (US)

(73) Assignees: STMicroelectronics Asia Pacific Pte Ltd., Singapore (SG); STMicroelectronics, Coppell, TX (US)

( * ) Notice: Subject to any disclaimer, the term of this patent is extended or adjusted under 35 U.S.C. 154(b) by 264 days.

(21) Appl. No.: 13/495,292

(22) Filed: Jun. 13, 2012

(65) Prior Publication Data

US 2012/0317662 A1 Dec. 13, 2012

Related U.S. Application Data

(60) Provisional application No. 61/496,204, filed on Jun. 13, 2011.

(51) Int. Cl.
```
G06F 1/26      (2006.01)
G06F 11/00     (2006.01)
G08B 13/00     (2006.01)
G08B 21/00     (2006.01)
G08B 29/00     (2006.01)
G06F 21/73     (2013.01)
H04L 9/32      (2006.01)
G06F 21/44     (2013.01)
```

(52) U.S. Cl.
CPC ............. G06F 21/73 (2013.01); G06F 21/44 (2013.01); H04L 9/3278 (2013.01)

(58) Field of Classification Search
CPC ...... G06F 21/50; G06F 21/57; G06F 11/3058; G06F 11/3062

USPC .......................................................... 726/34
See application file for complete search history.

(56) References Cited

U.S. PATENT DOCUMENTS

```
4,906,988  A  *  3/1990   Copella ................... 340/5.86
5,920,628  A  *  7/1999   Indeck et al. ............. 360/25
6,163,612  A  * 12/2000   Takeda .............. G06Q 20/341
                                                   380/281
6,181,814  B1 *  1/2001   Carney ..................... 382/137
6,636,689  B1 * 10/2003   Stebbings .................. 386/252
7,286,773  B2   10/2007   Rommelmann et al.
```
(Continued)

FOREIGN PATENT DOCUMENTS

```
CN    101485128  A    7/2009
CN    100561494  C   11/2009
KR    10-0565806      3/2006
```

OTHER PUBLICATIONS

International Search Report for PCT application serial No. PCT/US2012/042325, Korean Intellectual Property Office, Daejeon Metropolitan City, Korea, Feb. 22, 2013, 11 pages.

*Primary Examiner* — Christopher Revak
*Assistant Examiner* — Vadim Savenkov
(74) *Attorney, Agent, or Firm* — Seed IP Law Group LLP (57) ABSTRACT

In an embodiment, to deter or delay counterfeiting/cloning of a replacement component of a host device, the replacement component is provided with a code value. The code value is generated from a value of at least one physical parameter of the replacement component and is stored on the replacement component. The host device determines whether the replacement component is authentic if the stored code value matches a reference code value.

25 Claims, 7 Drawing Sheets (56) References Cited

U.S. PATENT DOCUMENTS

| | | |
|---|---|---|
| 7,796,759 B2 | 9/2010 | Wuidart et al. |
| 7,819,322 B2* | 10/2010 | Hammad et al. ............. 235/449 |
| 7,840,803 B2* | 11/2010 | Clarke et al. ................ 713/168 |
| 8,065,534 B2* | 11/2011 | Tan et al. ..................... 713/193 |
| 8,077,869 B2* | 12/2011 | Schantz ................. G06F 21/73 |
| | | 380/270 |
| 8,099,791 B1* | 1/2012 | Adkins et al. .................. 726/34 |
| 2004/0030896 A1* | 2/2004 | Sakamura ............ G06Q 20/341 |
| | | 713/169 |
| 2006/0098993 A1* | 5/2006 | Yang .............................. 399/12 |
| 2006/0210082 A1* | 9/2006 | Devadas ................ G06F 21/31 |
| | | 380/277 |
| 2007/0211292 A1 | 9/2007 | Walmsley |
| 2009/0027439 A1 | 1/2009 | Bauman |
| 2009/0307491 A1* | 12/2009 | Nakatsugawa ...... G06Q 20/341 |
| | | 713/169 |
| 2010/0027786 A1* | 2/2010 | Faith .................... G06F 21/606 |
| | | 380/44 |
| 2011/0109938 A1 | 5/2011 | Refstrup |

* cited by examiner

| Bit #1 | Bit# 2 | Algorithm Option | PLAINTEXT | KEY |
|---|---|---|---|---|
| 0 | 0 | 1 | Firing Nozzle #1 | Eprom Ref Bit 1 + Metal 1 + Doped Poly |
| 0 | 1 | 2 | Eprom Ref Bit #1 | Eprom Ref Bit #2 + Doped Substrate + Metal 2 |
| 1 | 0 | 3 | Dummy Nozzle #0 | Eprom Ref Bit #3 + Nozzle #1 + Metal 3 |
| 1 | 1 | 4 | FET Ron | Eprom Ref Bit #4 + Metal 1+ Metal 2 + Metal 3 |

| Analog Ron Values | CDF | Binary Representation | | | | | |
|---|---|---|---|---|---|---|---|
| < 3000 ohm | 0% | 1 | 1 | 0 | 0 | 1 | 1 |
| 3000 ohm | 0% | 0 | 0 | 1 | 1 | 1 | 1 |
| 3100 ohm | 5% | 1 | 1 | 1 | 0 | 0 | 0 |
| 3200 ohm | 10% | 1 | 0 | 1 | 0 | 1 | 0 |
| 3300 ohm | 20% | 1 | 1 | 0 | 0 | 0 | 1 |
| 3400 ohm | 40% | 1 | 0 | 0 | 0 | 1 | 0 |
| 3500 ohm | 60% | 0 | 1 | 0 | 0 | 1 | 0 |
| 3600 ohm | 80% | 0 | 1 | 0 | 0 | 0 | 1 |
| 3700 ohm | 90% | 1 | 0 | 1 | 0 | 1 | 0 |
| 3800 ohm | 95% | 0 | 0 | 1 | 1 | 0 | 0 |
| 3900 ohm | 100% | 1 | 1 | 0 | 0 | 0 | 1 |
| 4000 ohm | 100% | 0 | 1 | 1 | 0 | 1 | 0 |
| > 4000 ohm | 100% | 0 | 1 | 0 | 0 | 1 | 0 |

| Actual Resistance | Lookup Table | ID Bits #1 thru #4 |
|---|---|---|
| 500.0 | 1 | 00001 |
| 501.0 | 2 | 00010 |
| 501.0 | 3 | 00011 |
| 502.0 | 4 | 00100 |
| 502.0 | 5 | 00101 |
| 503.0 | 6 | 00110 |
| 503.0 | 7 | 00111 |
| 504.0 | 8 | 01000 |
| 504.0 | 9 | 01001 |
| 505.0 | 10 | 01010 |
| 505.0 | 11 | 01011 |
| 506.0 | 12 | 01100 |
| 506.0 | 13 | 01101 |
| 507.0 | 14 | 01110 |
| 507.0 | 15 | 01111 |
| 508.0 | 16 | 10000 |
| 508.0 | 17 | 10001 |
| 509.0 | 18 | 10010 |
| 509.0 | 19 | 10011 |
| 510.0 | 20 | 10100 |
| 510.0 | 21 | 10101 |
| 511.0 | 22 | 10110 |
| 511.0 | 23 | 10111 |
| 512.0 | 24 | 11000 |
| 512.0 | 25 | 11001 |
| 513.0 | 26 | 11010 |
| 513.0 | 27 | 11011 |
| 514.0 | 28 | 11100 |
| 514.0 | 29 | 11101 |
| 515.0 | 30 | 11110 |

# DELAYING OR DETERRING COUNTERFEITING AND/OR CLONING OF A COMPONENT

PRIORITY CLAIM

The present application claims the benefit of and priority under 35 U.S.C. §119(e) to U.S. Provisional Patent Application Ser. No. 61/496,204, entitled "DETECTING AN UNAUTHORIZED PRINT CARTRIDGE," filed Jun. 13, 2011, which is incorporated herein by reference in its entirety.

TECHNICAL FIELD

The present disclosure generally relates to encryption/decryption, and particularly, but not exclusively, relates to the use of encryption/decryption techniques to detect an unauthorized component, such as counterfeit and/or clone components.

BACKGROUND

Many products include one or more components that may be replaced (including upgrading) during the use of the product. Replacement may occur, for example, if the component completes its useful life, becomes obsolete, breaks down due to wear and tear or defects, or other reasons.

An example of a replaceable component is a print cartridge for an electronic printer. A print cartridge contains printing material such as ink or toner, and is placed into a cartridge receptacle of a printer. A black-and-white printer may take only one print cartridge that holds black ink or toner, while a color printer may take one or more print cartridges, for example one print cartridge that holds black ink or toner and one or more other print cartridges that hold colored inks or toners. During the use of the printer, the ink or toner in the print cartridge is used up, or the print cartridge may break down or become obsolete, thereby motivating the user of the printer to purchase a new print cartridge as a replacement.

Counterfeit and plug-compatible components may cause a significant loss of revenue for the manufacturers of the genuine/authorized replacement components. A counterfeiter, for example, manufactures a replacement component such as a print cartridge, and fraudulently markets the component as an authentic replacement component under the name of an authorized replacement-component provider. A plug-compatible manufacturer cloner, on the other hand, also manufactures a replacement component, but markets (at times legally) the component as a compatible replacement component under the name of an unauthorized (e.g., third-party) replacement-component provider.

BRIEF DESCRIPTION OF THE DRAWINGS

One or more non-limiting and non-exhaustive embodiments are described with reference to the following figures, wherein like reference numerals refer to like parts throughout the various views unless otherwise specified.

DETAILED DESCRIPTION

One or more embodiments of techniques to use encryption/decryption to detect unauthorized products, such as counterfeit and/or clone products, are described herein. In the following description, numerous specific details are given to provide a thorough understanding of one or more embodiments. The one or more embodiments can be practiced without one or more of the specific details, or with other methods, components, materials, etc. In other instances, well-known structures, materials, or operations are not shown or described in detail to avoid obscuring aspects of the one or more embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The present disclosure relates generally to techniques to deter or delay attempts to counterfeit/clone replaceable components of products, such as via the use of a code value that is associated with a replaceable component and which is de-coded during a validation process. In one embodiment, complexity can be added to the code value, without substantially adding to manufacturing costs. By adding complexity, the replaceable component would more difficult to reverse-engineer. The potential counterfeiter/cloner would need to invest in additional development cost and/or time to "break the code," thereby causing the counterfeiting/cloning of the replaceable component to be less favorable to the potential counterfeiter/cloner. The additional cost/time could prevent, or at least delay, the counterfeiter/cloner in producing a functional counterfeit/clone replacement component. Therefore, by the time the counterfeit/clone replacement component is made, the original/valid manufacturer ideally would have moved onto the next generation or version of the replaceable component, thereby making the counterfeit/clone replacement component obsolete.

According to various embodiments, the code value is generated from a measured or otherwise determined (including estimated) value of at least one physical parameter of the replaceable component, such as a resistance of a resistor on an integrated circuit and/or one or more other electrical or mechanical parameters. The measured/determined value may then be encoded (including the use of encryption with a key) to obtain the code value, and the code value may then be associated with the replaceable component, such as by storing the code value in a memory of an integrated circuit in the replaceable component. The code value may later be decoded (including decryption with the key) by a host device to determine whether the replaceable component is genuine.

According to some embodiments, a physical parameter of an integrated circuit of the replaceable component could be measured to determine its analog value, such as at electrical test stage of a manufacturing process. That measured value may then be used as an input/source to generate a code value (which may be in binary form and kept secret) that is unique to that specific replaceable component and/or to the host device for the replaceable component. The code value of some embodiments may be stored in the integrated circuit, such as in a storage unit that may include data storage circuit arrays or a memory circuit arrays such as erasable programmable read only memories (EPROMS) or electronically erasable programmable read only memories (EEPROMs).

In one embodiment, a relationship between the measured parameter of the replaceable component in its analog value and the binary code value in its digital representation may also be encrypted/encoded.

In one embodiment, the host device is able to perform the same measurement on the replaceable component to determine the analog value of the parameter(s). The host device may then perform an encryption process to translate that analog value to a binary representation. In a subsequent step, the host device may perform a match between the translated binary representation with the binary code value stored in the replaceable component—the replaceable component may be deemed/determined to be valid if the two code values match.

According to various embodiments, the complexity and hence robustness of the encryption/decryption system may be further enhanced by the following:

A set of parameters of the replaceable component is measured and a plurality of the resulting analog values may be individually translated to their respective binary representation. Any one or more of these binary representations can be used as the code value, including a final code value obtained from operations (such as logical operations) performed on the individual binary representations.

The set of parameters may have a secret range of valid values that can be tied to the manufacturing condition of the replaceable component (e.g., the manufacturing condition of its integrated circuit). Such manufacturing condition can include the type of manufacturing equipment, process recipes, direct materials, etc. as well as interactions among all of these. Only with the access of such information and the time-consuming and expensive duplication of such conditions can a potential counterfeiter/cloner be able to reproduce the same range of valid analog values.

The encryption/encoding algorithm can be made unique from chip to chip or application to application by using a different sub-set of the parameters.

Different test conditions (e.g., temperature) may cause the parameter of the replaceable component to have different measured analog values (e.g., resistance) at different test conditions. Selecting a particular test condition as part of the encryption/encoding for the same parameter can yield a different analog value and thus a different binary representation.

The wafer lot and/or wafer number identification, as well as the die location in terms of its row/column position within a wafer, can be used to randomize the sub-set of parameters used in the encryption/encoding algorithm.

Several alternative encryption/encoding algorithms that use different subsets of parameters may be preprogrammed into a host device. This provisioning of multiple algorithms enables a change of algorithms within the usage life of the replaceable component and/or host device, enables validation to be tied to a calendar year, enables a different algorithm to be used based on the geographical location of the usage, and other flexibility.

Figure 1:
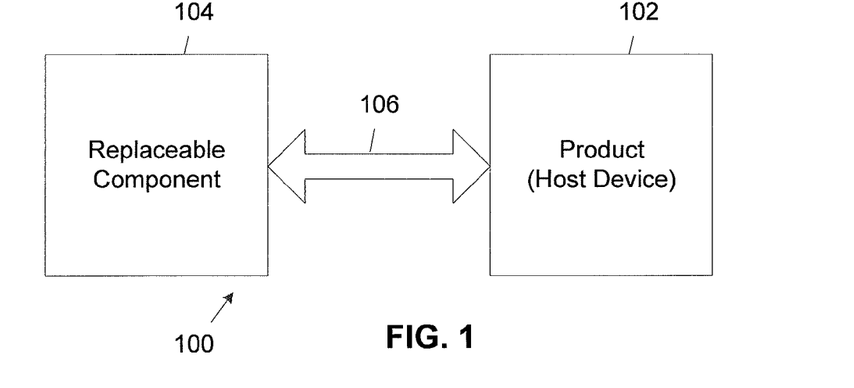
FIG. 1 illustrates a product and a corresponding replaceable component for the product in accordance with various embodiments.

FIG. 1 shows an example system 100 in which various embodiments may be implemented. The system 100 may include a first apparatus 102 and a second apparatus 104. The first apparatus 102 may include, for example, an electronic device such as a printer, digital camera, a television, wireless communication device, or other electronic product that is configurable as a host device. In some embodiments, the first apparatus 102 may include some other type of product that may be predominantly mechanical or a combination of electrical and mechanical, such as an automobile, tool, or other host device.

In one embodiment, the first apparatus 102 includes at least one replaceable component, which is represented by the second apparatus 104. The second apparatus 104 may thus be electrically, mechanically, communicatively, and or otherwise coupled to the first apparatus 102 via a coupling 106. For example, in an embodiment wherein the first apparatus 102 is a printer, the second apparatus 104 may be a print cartridge and the coupling 106 may be the electrical and mechanical connections between the printer and print cartridge that enable the printer to read data from the print cartridge, to operate/control the print cartridge, etc.

According to various embodiments, the first apparatus 102 and the second apparatus 104 can include a product and a corresponding replaceable component, such as a printer and a print cartridge, a camera and a lens, a cellular telephone and a battery, a television set and a remote control, a computer and a keyboard/drive/mouse/screen or other peripheral, a car and an oil filter (or other automobile part), or other host device and corresponding replaceable component having at least one physical characteristic that may be measured and used as a basis for a code value, as will be explained in more detail below. Throughout the present description, the first apparatus 102 and the second apparatus 104 may at times be described in the context of a printer and print cartridge, for the sake of illustration and ease of explanation. But it is understood that such description is intended to be by way of example, and is not intended to limit the subject matter to only printers and print cartridges.

Figure 2:
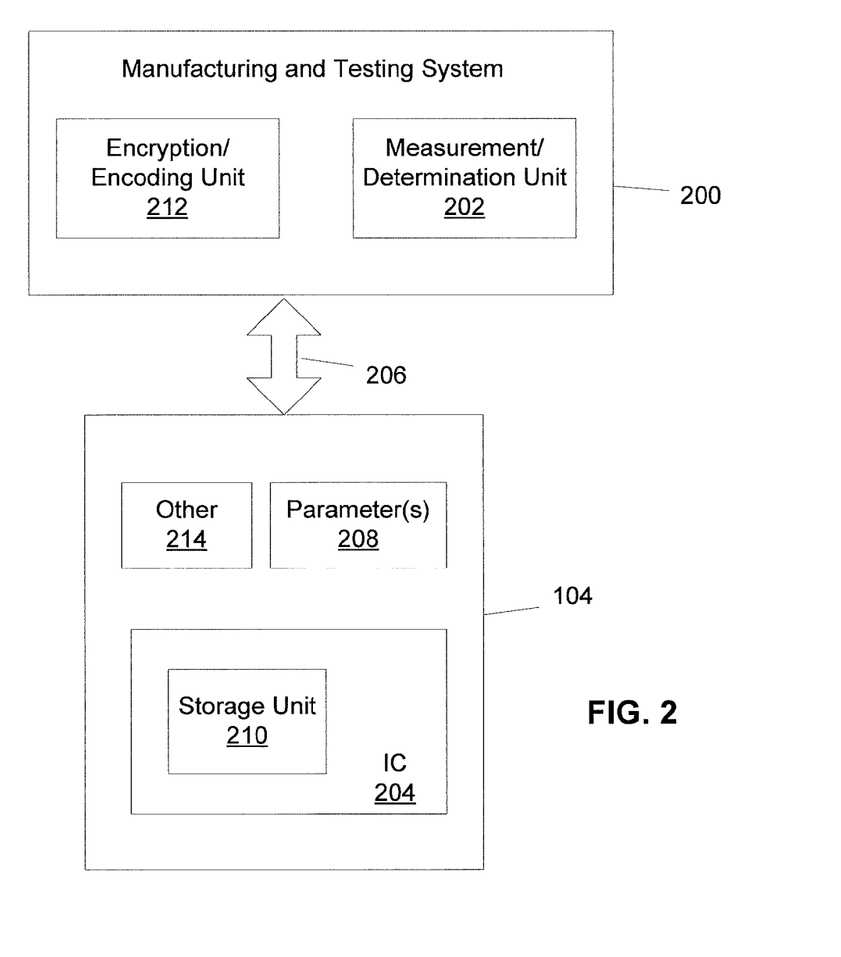
FIG. 2 is a block diagram illustrating a manufacturing and testing system and further details of the replaceable component of FIG. 1 in accordance with various embodiments.

FIG. 2 shows an example manufacturing and testing system 200 and further details of the replaceable component (second apparatus 104) in accordance with various embodiments. The manufacturing and testing system 200 may be used for the manufacturing stage, for example, and includes a measurement/determination unit 202 to wafer test an integrated circuit 204 (such as integrated circuits for print cartridges or other types of replaceable component that can be provided with an integrated circuit). The measurement/determination unit 202 may be used to determine other values of the second apparatus 104.

The measurement/testing of the second apparatus 104 by the manufacturing and testing system 200 is represented at 206 in FIG. 2. For example, the integrated circuit 204 or other portion of the second apparatus 104 may include one or more parameters 208 that may be measured/determined by the unit 202 and then digitized (if needed). Examples include resistances of different elements of the integrated circuit 204, such as a poly-region or a metal region, or even a parasitic region, or combinations or multiples thereof. Other alternative or additional examples of measurable or determinable parameters 208 may include circuit outputs, such as an output of a temperature sensor at a particular temperature, an output of a voltage sensor if a transistor has a particular current through it, a nozzle resistor value, a nozzle diameter, resistor area, a capacitor value, an on-resistance of a transistor, silicon bulk resistance, erasable programmable read only memory (EPROM) resistance, a voltage level of a memory cell, etc. Other examples of the parameters 208 may include a doping resistance, circuit node resistance, a transistor ON voltage, and various operating conditions (e.g., applied voltage/current, applied time, etc.). These are but a few examples of the possible parameters 208 that may be measured or determined, such as during a manufacturing stage, testing stage, or other stage. As such, the unit 202 may include any suitable instrumentation (such as an ohm-meter, volt meter, current meter, temperature sensor, etc.) to enable such parameters 208 to be measured/determined. Furthermore, the parameters 208 can be contained within the integrated circuit 204 and/or located off-chip elsewhere on the second apparatus 104.

In one embodiment, the second apparatus 104 may include a storage unit 210 that may be located on the integrated circuit 204 or located elsewhere in the second apparatus 104. The storage unit 210 may include an electrically erasable-programmable read-only memory (EEPROM) or other memory device. In some embodiments, the storage unit 210 may be in the form of a bar code, a matrix code, a radio frequency identifier (RFID), or other machine-readable device that contains a machine-readable representation of data.

According to various embodiments that will be described herein, the storage unit 210 may be configured to store a code value that is an encrypted/encoded output of an encryption/encoding unit 212 of the manufacturing and testing system 200. In one embodiment, the code value includes a binary number or other digital value. Further details as to example techniques used by the encryption/encoding unit 212 to generate the code value, using one or more of the parameters 208, will be described later below.

The second apparatus 104 may include other elements 214 to provide the functionality and structure of the replaceable component. Examples include a print nozzle and ink reservoir for a print cartridge, or an electrical and/or mechanical interface to receive the replacement component. For the sake of brevity, the other elements 214 are not described or identified in further specific detail herein.

Figure 3:
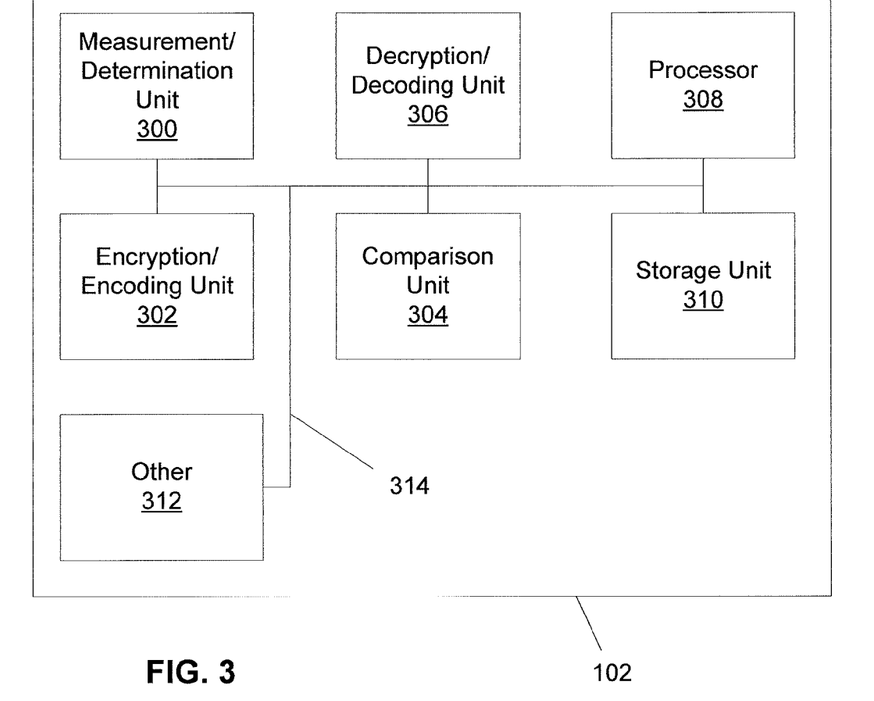
FIG. 3 is a block diagram illustrating further details of the product of FIG. 1 in accordance with an embodiment.

FIG. 3 shows further details of the product (first apparatus 102) of FIG. 1. The first apparatus 102 of one embodiment may be a host device that includes a measurement/determination unit 300 and an encryption/decryption unit 302 to respectively perform the same or similar operations as the unit 202 and 212 of the manufacturing and testing system 200. For instance, the measurement/determination unit 300 may be used to measure or determine the parameter(s) 208, and the encryption/decryption unit 302 in turn generates a reference code value from the measured/determined parameter(s) 208 using the same or similar algorithm that was used by the unit 212. A comparison unit 304 then compares the reference code value generated by the unit 302 with the code value stored in the storage unit 210, and generates a comparison output. The replaceable component is determined to be valid if the comparison output indicates that the compared code values match each other.

In another embodiment, the first apparatus 102 may include a decryption/decoding unit 306 that is configured to decrypt/decode the code value stored in the storage unit 210 of the replaceable component, so as to obtain the underlying measured/determined value of the parameter(s) 208. In such an embodiment, the encoding/encryption unit 302 of the first apparatus 102 may be omitted or not used, such that the comparison unit 304 is configured to compare the underlying value (as decrypted/decoded) by the unit 306 with the measured/determined value as provided by the unit 300, to determine if the compared values are the same.

In some embodiments, the comparison unit 304 may compare the stored value and/or the decrypted value with a reference parameter value that may be pre-stored in the first apparatus 102, instead of the first apparatus 102 performing a measurement of the parameter value.

In one embodiment, the decryption/decoding unit 306 may use the same key as that used for encryption/encoding of the stored value, in order to decrypt the stored code value. The key, for example, may be a parameter value itself that is measured by the unit 300 from the replaceable component, or may be a pre-stored value in the first apparatus 102. In other embodiments, the comparison may be performed through the use of lookup tables that have reference values (for code values or the underlying parameter value) that map to particular stored code values or their underlying parameter values.

As can be readily ascertained from the above description, numerous techniques are possible for use in the decryption/decoding, including the selection of the particular reference value (whether encrypted/encoded or not) for use in comparing against the stored code value and/or against the underlying parameter value, or for use as a key for decrypting/decoding, or for use in combinations and/or multiple levels of decryption/decoding, etc.

The first apparatus 102 may further include at least one processor 308 to control various operations of the first apparatus 102, including controlling or performing the encryption/encoding and the decryption/decoding. The first apparatus 102 may further include at least one storage unit 310, such as a memory or other tangible non-transitory computer-readable storage medium. In one embodiment, the storage unit 310 may include software or other computer-readable instructions that are executable by the processor 308, such as software to perform the encryption/encoding and the decryption/decoding. In some embodiments, at least some of the units 300, 302, 304, and 306 may be embodied as such computer-executable instructions stored in the storage unit 310.

The first apparatus 102 may include other elements 312, which for the sake of brevity are not described in detail herein. Such other elements may include, for example, a key pad, printing mechanisms, electronic circuitry, a display screen, and so forth. A bus 314 is configured to couple the various elements of the first apparatus 102 to each other.

Figure 4:
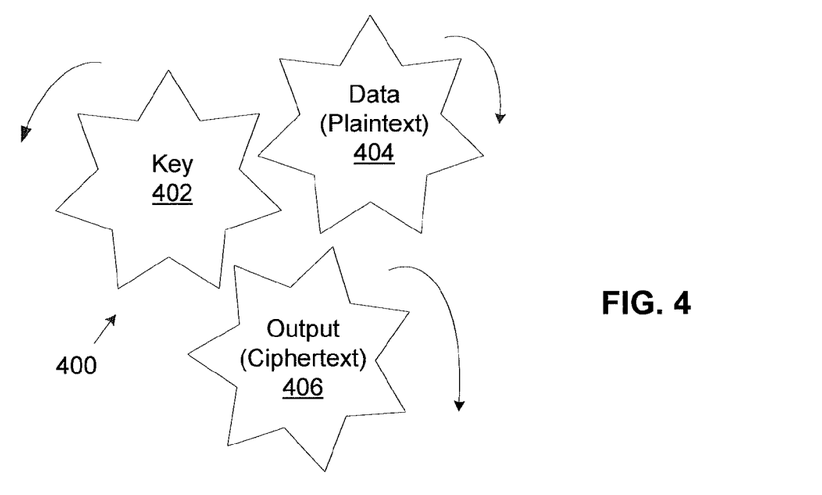
FIG. 4 is a graphical representation of an embodiment of an encryption/encoding method to generate a code value using input parameters that are measured/determined from the replaceable component of FIGS. 1-2.

FIG. 4 is a flow diagram illustrating an embodiment of an encryption/encoding method 400 to generate a code value using input parameters 208 that are measured/determined from the replaceable component (second apparatus 104) of FIGS. 1-2. The method 400 of one embodiment can be based on an encryption/encoding algorithm such as data encryption standard (DES), data encryption algorithm (DEA), triple DES (3DES), triple DEA, advanced encryption standard (AES), and others. For instance with 3DES, a fixed-length string of "PLAINTEXT" bits is transformed through a series of operations into a "CIPHERTEXT" bit string of the same length. A "KEY" is used to customize the transformation, so that decryption can be performed by those who know the particular key used to perform the encryption. The method 400 and/or the other encryption/encoding methods described herein may be performed in various embodiments by the encryption/encoding unit 212 of the manufacturing and testing system 200 of FIG. 2.

In the embodiment of the method 400 of FIG. 4, digital values of one or more of the measured/determined parameters 208 are run through an encryption scheme (such as a DES algorithm) to generate the output code value. The measured/determined values of the parameters 208 can be used/substituted for a KEY 402 and/or a PLAINTEXT data 404 and run through the algorithm to generate the code value, which is or is equivalent to an output CIPHERTEXT 406.

The robustness of the encryption/encoding algorithm can be controlled by selecting a bit size of the KEY 402 and/or the PLAINTEXT data 404. For example, a bit size of 8 bits may provide a lower level of protection, while a bit size of 256 bits (or more) may provide a higher level of protection. Certain factors may influence the bit size that is selected for the encryption/encoding algorithm, including but not limited to, manufacturing costs, complexity of the circuitry or other elements of the first apparatus 102 and/or the second apparatus 104, desired time to delay counterfeiting/cloning, processing power of the manufacturing and testing system 200 and/or of the first apparatus 102, value of the replaceable component, the type of parameter 208 used, and so forth.

Figure 5:
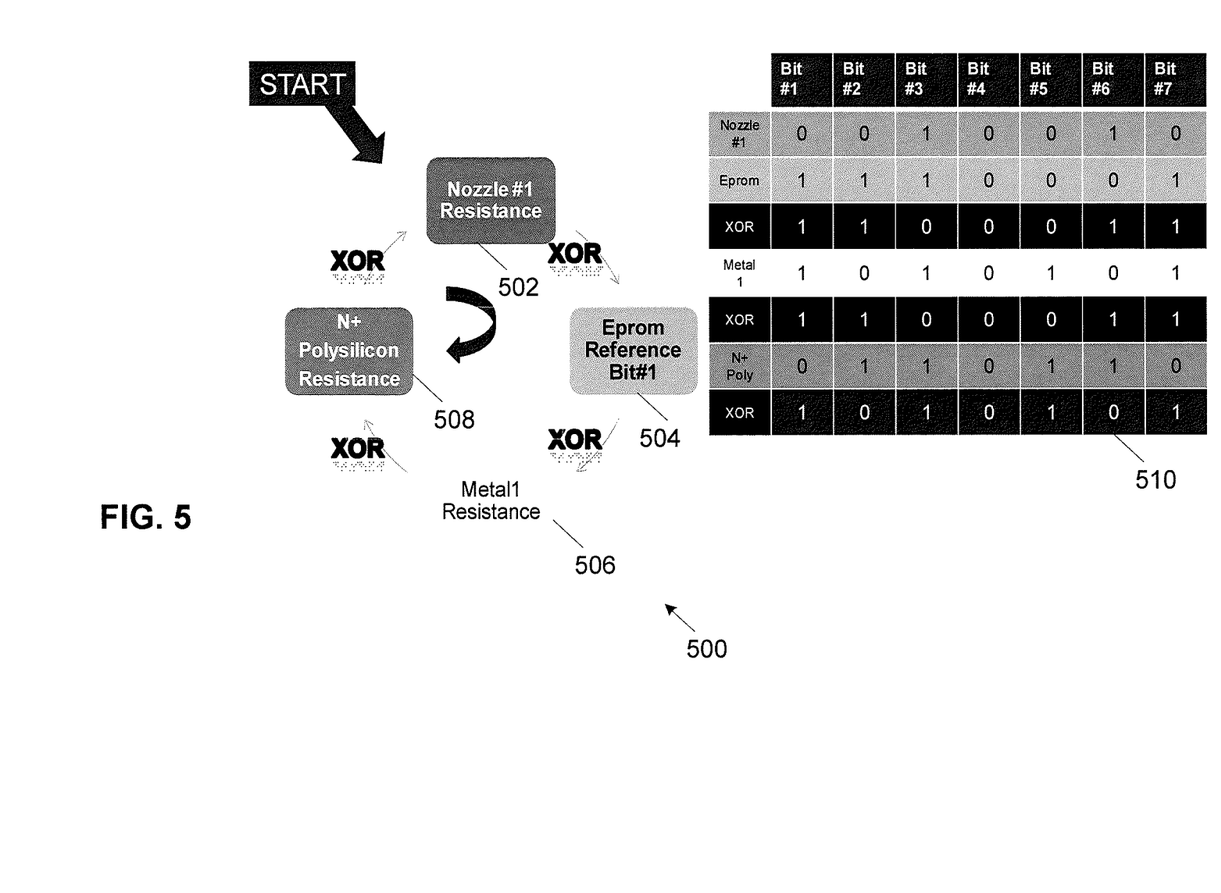
FIG. 5 is another graphical representation of an embodiment of an encryption/encoding method to generate a code value using input parameters that are measured/determined from the replaceable component of FIGS. 1-2.

FIG. 5 is another graphical representation of an embodiment of an encryption/encoding method 500 to generate a code value using input parameters 208 that are measured/determined from the replaceable component 104 of FIGS. 1-2. In an embodiment of the method 500, a number of the measured/determined values of the parameters 208 are digitized and run through an exclusive OR (XOR) coding scheme to generate the output code value.

As an example, there may be four measured/determined values of the parameters 208 that are used: nozzle resistance 502, EPROM resistance 504, metal1 resistance 506, and N+ polysilicon resistance 508. Each of these values may be digitized into a binary number having 8 bits. A lookup or truth table 510 shows example bit values of the 8 bits of each of these measured/determined parameters. After the bit values of these measured/determined parameters are populated into the table 510, one or more XOR operations can be performed on the bit values of multiple parameters, and the output(s) of the XOR operation(s) can be further XOR'ed with each other and/or with parameter values, so as to perform multiple rounds/levels of encoding/encryption using XOR operations until a final output code value is obtained for the table 510.

Figure 6:
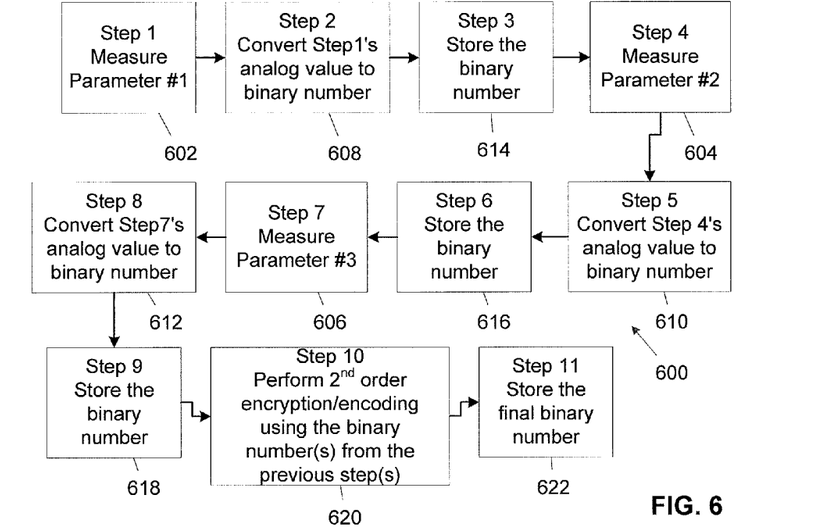
FIG. 6 is a flow diagram illustrating an embodiment of an encryption/encoding method to generate a code value using input parameters that are measured/determined from the replaceable component of FIGS. 1-2.

As previously explained above, at least one parameter 208 may be used to generate the code value. FIG. 6 is a flow diagram of an embodiment of an encryption/encoding method 600 wherein instead of using just one parameter 208 to generate a code value, the algorithm can use multiple parameters to generate the code value. In particular, the illustrated embodiment of FIG. 6 uses a first level of encryption/encoding to generate code values from a plurality of parameters 208, and then these code values can in turn be used in a second level of encryption/encoding to generate a final code value. This multiple-level of encryption/encoding increases the complexity of the code value because now the cloner/counterfeiter would need to identify not only which single parameter value is measured/determined and encrypted, but also which combination of values are measured/determined and encrypted and the manner in which the values are combined to perform that encryption.

In the example method 600, three parameter values are used, such as three of the resistances in FIG. 5. The resistances are measured (to obtain analog values) at 602, 604, and 606; the measured analog values are converted into digital values and each of these digital values is run separately through an encryption algorithm to generate, for each of these values, a corresponding encrypted value (e.g., a code value) at 608, 610, and 612; and then each generated code value (in binary form) is stored in the storage unit 210 at 614, 616, and 618. The process may be repeated for additional parameters 208.

Then at 620, a second-order encryption/encoding algorithm or a second-level encryption/encoding algorithm may applied to these multiple code values from the first level. As one example, a logical operation can be performed on the code values, and then encrypted/encoded at 620. The second-level code value from this second encryption/encoding process may then be stored in the storage unit at 622. Later during the decryption/decoding process performed by the first apparatus 102, any or all of the code values from the first and second encryption/decryption processes may be used to validate the second apparatus 104 (replaceable component).

Figure 7:
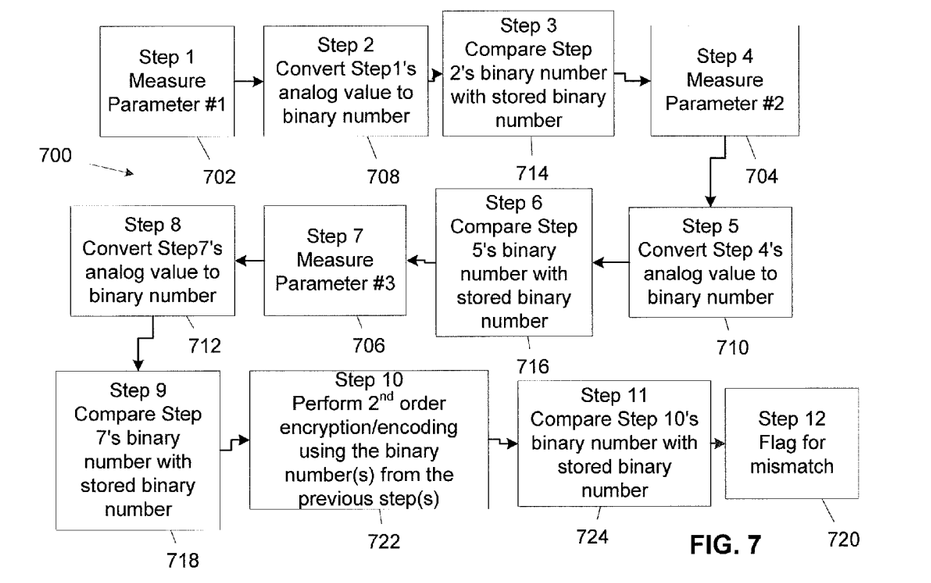
FIG. 7 is a flow diagram illustrating an embodiment of a decryption/decoding method corresponding to the encryption/encoding method of FIG. 6.

For instance, FIG. 7 is a flow diagram illustrating an embodiment of a decryption/decoding method 700 corresponding to the encryption/encoding method 600 of FIG. 6. The measurement/determination unit 300 of the first apparatus 102 may first measure/determine the same parameters 208 (such as resistances) at 702, 704, and 706 to obtain analog values. Then, using the encryption/encoding unit 302, the measured analog values are converted into digital values and each of these digital values is run separately through an encryption algorithm to generate, for each of these values, a corresponding encrypted value (e.g., a code value) at 708, 710, and 712. Next, the comparison unit 304 compares these generated code values to the code values stored in the storage unit 210, at 714, 716, and 718. If the result of the comparison provides a match, then the replaceable component is deemed to be valid/eligible for the second level validation process. Else if there is a mismatch, the replaceable component is rejected and a rejection message is provided by the first apparatus 102 at 720.

In the second level validation process at 722, the encryption/encoding unit 302 applies an encryption/encoding algorithm to the code values obtained 708, 710, and 712 to obtain a second-level code value. The comparison unit 304 then compares this obtained second-level code value with the stored second-level code value in the storage unit 210. If there is a match, then the replaceable component is validated for use. Else if there is a mismatch, the replaceable component is rejected at 720.

Figure 8:
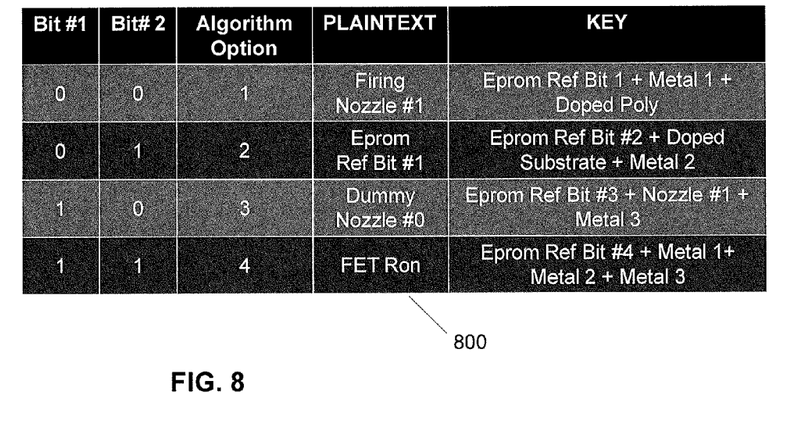
FIG. 8 is an example table illustrating an embodiment of an encryption/encoding method to generate a code value using input parameters that are measured/determined from the replaceable component of FIGS. 1-2.

FIG. 8 is an example table 800 illustrating another embodiment of an encryption/encoding method to generate a code value using input parameters 208 that are measured/determined from the replaceable component of FIGS. 1-2. In such an embodiment, a plurality of selectable encryption/encoding algorithm options may be provided for the system 100. This embodiment enables the flexibility to alter/change the encryption/encoding algorithm to provide another level of security against the counterfeiters in the event that the current algorithm has been broken. Alternatively or additionally, the regionalization of ink cartridges or other replaceable components can be tied with a specific encryption algorithm.

In the example of FIG. 8, the particular algorithm (amongst four available algorithms) to select may be identified by a particular binary number stored in bit positions, such as in bit positions in the storage unit 210. The table 800 may thus serve as a lookup table to determine the parameters to use for the Plaintext and Key inputs into the algorithm.

For instance in the case of a print cartridge, if algorithm #1 is selected, the table 800 will indicate that the Plaintext input to use is the firing nozzle resistance and the Key input to use is a sum of three encrypted/encoded parameter values (e.g., value of EPROM bit #1, metal 1 resistance, and doped polysilicon resistance). The Plaintext and the Key inputs are then applied to the encryption/encoding algorithm to generate a final code value. Accordingly, this technique may be more difficult to crack because the cloner/counterfeiter would first have to determine which parameters 208 are being used, how each parameter value is being individually encrypted/encoded to generate a respective specific code value, which encryption/encoding algorithm to select, and then how those first-level encrypted/encoded values are being used in the selected algorithm to obtain the final code value.

Still referring to the table 800 of FIG. 8, the Plaintext input and/or any one or more of the other inputs can be un-coded. That means that the Plaintext value or other parameter value can just be the actual value that is measured/determined without first encrypting/encoding or otherwise translating the value. However, the counterfeiter/cloner would need to determine which parameter values are encrypted/encoded and which are not, the manner in which such values are used in the algorithm, which algorithm to use, etc.

Figure 9:
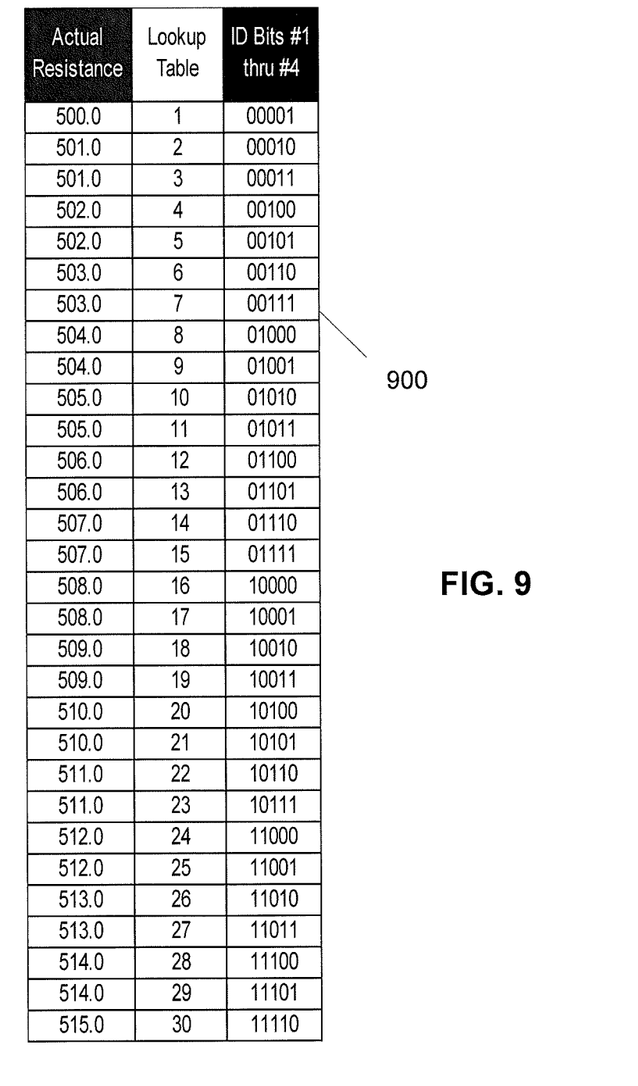
FIG. 9 is an example table illustrating an embodiment of an encryption/encoding method to generate a code value using input parameters that are measured/determined from the replaceable component of FIGS. 1-2.

FIG. 9 is an example table 900 illustrating another embodiment of an encryption/encoding method to generate a code value using input parameters 208 that are measured/determined from the replaceable component of FIGS. 1-2. Specifically, the table 900 serves as a randomized lookup table that provides a number of actual values within a range that is expected for a particular parameter (such as a range between 500 and 515 ohms). Therefore, instead of measuring 515 ohms and just converting 515 ohms into a numerically equivalent digital value, the "515" would be the input/index into the table 900, and a value associated with "515" would be provided by the table 900. Such provided/outputted value associated with "515" could be a code value that is non-linearly and/or randomly related to 515 ohms, such as a number "30" created by a random number generator.

Figure 10:
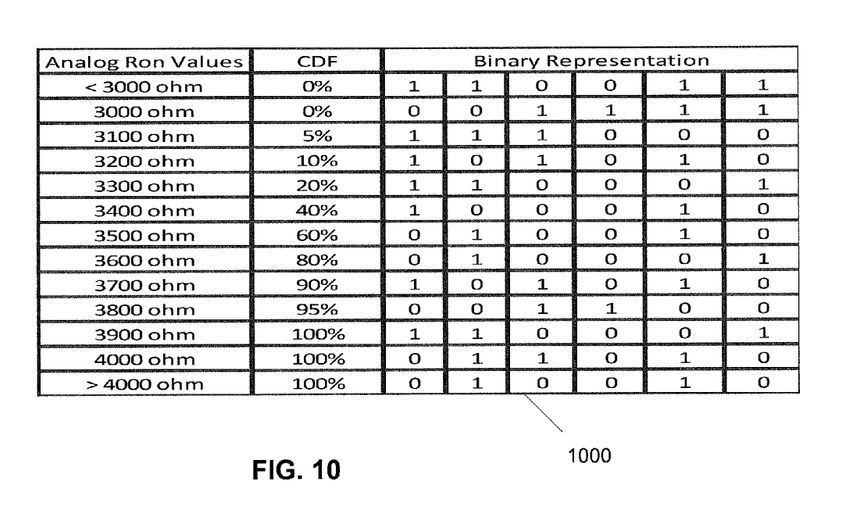
FIG. 10 is an example table that may be used by an embodiment of an encryption/encoding method to generate a code value using input parameters that are measured/determined from the replaceable component of FIGS. 1-2.

FIG. 10 is a table 1000 that represents an embodiment of another encryption/encoding method to generate a code value using input parameters 208 that are measured/determined from the replaceable component of FIGS. 1-2. For example, within the manufacturing conditions and the process interaction over a period of time, there may be wafer-wafer and lot-lot variations of certain parameters 208 (such as a turn ON resistance). Alternatively or additionally, there may be a bit of error in the measurements, for instance because perhaps a resistance measured in the factory may not exactly equal the resistance measured by the first apparatus 102, or the measured resistance may have low resolution. These variations can be made known or otherwise specified within a certain confidence limit (e.g., ranges). These ranges of variation may then be tabulated into the table 1000, such as a lookup table that includes: the parameter values along a range (for example ohm values of an analog turn ON resistance between 3000 and 4000 ohms), a percentage confidence value, and a binary representation for each ohm value. The binary representation shown in the table 1000 thus can be used as a code value, depending on the specific corresponding ohm value.

In an example operation using the table 1000, a measured/determined integer ohm value may be 3250 ohms, and so this ohm value may be rounded up to 3300 ohms (so as to obtain an output code value of 110001) or rounded down to 3200 ohms (so as to obtain an output code value of 101010). Whether to round up or to round down may be based on whether the measured value is closer to one value in the table 1000 versus another value in the table 1000, a default setting, or other factors.

With specific reference to the example resistance values depicted in the table 1000 of FIG. 10, a manufacturer may be capable to run a turn ON resistance between 3000 and 4000 ohms all the time. This predictable range of the resistance value can be partly due to the design, but it can also be due to the choice of fabrication tools, process recipe, interaction of several work centers, or other factors. The choice of a valid range to be used in the encryption can then be from 3000 ohms to 4000 ohms, since the manufacturer would produce very little produced outside this range. If the counterfeiters/cloners do not produce within this range with a very high confidence, a large part of their volume would be rejected by the algorithm for falling outside of the valid range. Coupled with the fact that the counterfeiters/cloners are unaware of this encryption algorithm/range in the beginning, they may incur large amount of resources and time to perform costly iterations, including the non-trivial tasks of modifying or re-tuning their fabrication process, in order to produce components having parameter values that fall within the valid range. By the time the counterfeiter/cloner may have determined/duplicated the valid range, the original manufacture may have released subsequent versions/generations of the replaceable component, which would have new and different valid ranges for the parameter values.

Therefore, in addition to all the encryption/description described above with respect to the table 1000, the algorithm can be such that the first apparatus 102 will reject a replaceable component that has a resistance that is outside of the 3000 to 4000 ohm window. For instance, if the resistance is 2500 ohms, then the first apparatus 102 may just reject the replaceable component outright, perhaps without even needing to do decrypt any other values. That is, in one embodiment, once the first apparatus discovers the out-of-range value, the first apparatus 102 may halt the validation process immediately and label the replaceable component as a clone/counterfeit.

Figure 11:
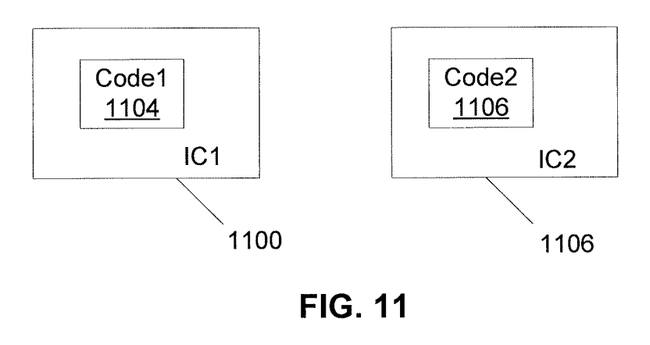
FIG. 11 shows example integrated circuits having respective different code values based on input parameters that are measured/determined.

FIG. 11 illustrates still another embodiment in which values of the parameters 208 are used to generate a code value. In FIG. 11, the replaceable component may include integrated circuit chips 1100 and 1102, both of which for instance may be chips for print cartridges or other type of replaceable component. In such embodiment(s), one can provide a variation in code values 1104 and 1106 from one integrated circuit chip to another integrated circuit chip, or from application to application, by using different physical parameters for each chip, or by using different groups of multiple physical parameters, from which to generate the code values.

For example, for the integrated circuit chip 1100, the algorithm could use the values of a metal-trace resistance, a transistor on-resistance, and a nozzle resistance, whereas for the other integrated circuit chip 1102, the algorithm can use a poly-silicon resistance, the on-resistance of another transistor, and a voltage across a transistor at a particular gate-source voltage. Such embodiment increases the robustness of the encryption/encoding because the cloner/counterfeiter will be unable to find one group of parameters that works for all integrated circuits for print cartridges (for example), because the parameters may change from cartridge to cartridge.

Figure 12:
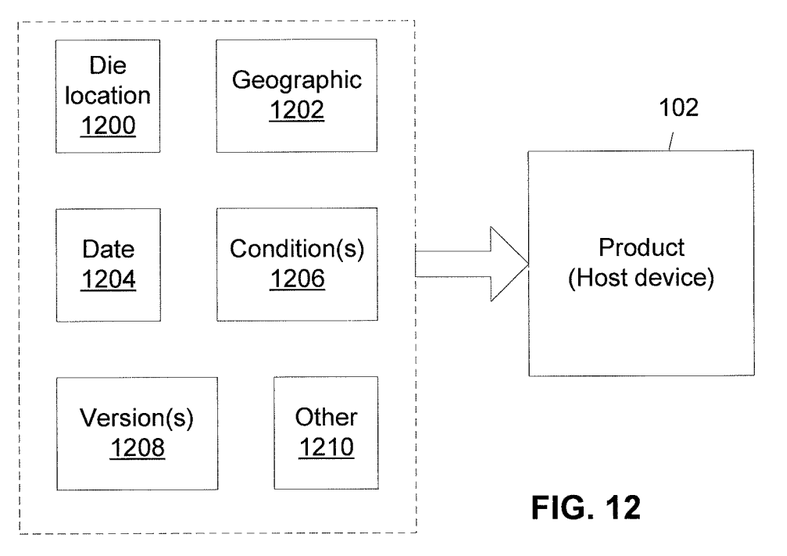
FIG. 12 is a block diagram illustrating examples of various indicators that may be used to determine which input parameters and/or which encryption/encoding algorithm to use to validate the replaceable component of FIGS. 1-2.

FIG. 12 is a block diagram illustrating various indicators that may be used by the first apparatus 102 to determine which input parameters 208 and/or which encryption/encoding algorithm to use to validate the replaceable component of FIGS. 1-2. It is understood that FIG. 12 illustrates a non-exhaustive identification of possible indicators.

An example indicator may be a die location indicator 1200. Most integrated circuits store, in an onboard memory, the location on the wafer from which they were diced. This location is usually stored in terms of a row and a column, where the integrated circuit was located at the intersection of that row and column. For instance, if the first apparatus 102 reads that the replacement component's integrated circuit came from row 5, then the first apparatus 102 will know that it needs to use, in the decrypting/decoding process, the measured values of a certain subset of parameters 208 (and/or algorithm), whereas if the integrated circuit came from row 7, the first apparatus 102 will know that it needs to use another subset of parameters 208 (and/or algorithm) for the decryption/decoding.

Another indicator that the first apparatus 102 can use to determine which subset of parameters 208 (and/or algorithm) to use is a geographic location indicator 1202 that may be stored on the integrated circuit. For example, some replaceable components may have a code indicating that they are intended for sale in the United States, and others have a code indicating they are for sale in China. The first apparatus 102 could read the code, and if it sees that the integrated circuit stores a code for the United States, then the first apparatus 102 may use a particular decoding algorithm (which may entail a specific set of physical parameters). If the first apparatus 102 sees a code for China, then the first apparatus 102 may use another decoding algorithm (which may include another set of physical parameters). With such an embodiment, even if the cloners/counterfeiters crack the code for China, then doing so does not necessarily mean that they have cracked the code for the United States.

Another possible indicator in FIG. 12 is a date code indicator 1204 that may be stored on a replaceable component to trigger the type of algorithm and/or parameters 208 that the first apparatus 102 will use. For example, assume that all versions of the first apparatus 1-2 understand algorithms 1 through 4, and the replaceable component uses a particular algorithm based on the year in which it is manufactured. So, replaceable components manufactured in 2012 would use algorithm 1, replaceable components manufactured in 2013 would use algorithm 2, etc. Then, when the first apparatus 102 reads the date code indicator 1204 on the replaceable component (such as "2012"), then the first apparatus knows that it should use algorithm 1. Therefore, this feature would be helpful because now the customer, who may have an older print cartridge but buys a new printer, could still use the older print cartridge on the newer printer.

This feature may also thwart the cloner/counterfeiter because, for example, if the counterfeiter/cloner cracks the code for algorithm 1 that is in use in 2012 and if the cloner/counterfeiter does not understand that the printer is looking for a date code, then in 2013 and subsequent years, the counterfeit/clone cartridges will not work because now the printer is using algorithm 2. If the cloner/counterfeiter was able to determine that the printer is looking for a date code and knew where the date code was and how it was encrypted/encoded in the replaceable component, then the counterfeiter/cloner could include a fake date code in the correct memory location and fool the printer into using algorithm 2. However, the process of determining this information slows down the cloner/counterfeiter, which is one of the intents of the embodiment.

Another possible indicator for the first apparatus 102 is a condition indicator 1206. For instance, the measurements/ determination of the values of the parameters 208 during the manufacturing process may have been done under special test conditions or secret test conditions that the cloner/ counterfeiter may not be aware of. As an example, instead of measuring a resistance value only when a print cartridge is at room temperature, the printer may first heat up the print head as if it was going to perform a print, but then measure a parameter such as a resistance when the print head temperature reaches, for example, 40 degrees Celsius as specified by the test indicator 1206. Therefore, the cloner/ counterfeiter, in addition to determining which parameter 208 needs to be measured, must also determine under what conditions that parameter needs to be measured.

Another example is to measure a temperature co-efficient of a particular device in the replaceable component. For instance, at the manufacturing stage, the resistance of a trace is measured at one temperature, and then the temperature is increased and the resistance is measured again at another specified temperature. A rough linear estimation of the change in resistance per degrees Celsius may thus be the encrypted/encoded parameter to be used for validation, and the condition indicator 1206 may be used to inform the first apparatus 102 of the parameter 208 to be measured/determined and the condition(s) in which such measurement/ determination is to be made. Such information would be difficult for a cloner/counterfeiter to determine, since for example, the counterfeiter/cloner would not only need to determine that a temperature co-efficient is being used, but the counterfeiter/cloner would also need to know at what points the temperature was measured.

Still another possible indicator in FIG. 12 for the first apparatus 102 is a version indicator 1208, for use in a "phase out" process. Assume for instance that a manufacturer is going to introduce 4 versions of a printer in the next 4 years, where the first version will be introduced in year 1, the second version in year 2, the third version in year 3, and the fourth version in year 4. The first version of the printer is programmed to understand and decrypt 4 different algorithms. Then, in the same year that that first version is introduced, print cartridges are manufactured that have only been encrypted using algorithm 1. So, because the printer version released in the first year understands algorithm 1, and because the print cartridges understand algorithm 1, the first-year print cartridges work with the first-year printers.

Assume then that in year 2, the manufacturer introduces the second printer version, but that printer version is designed to only understand algorithms 2 through 4. Furthermore, the manufacturer starts making print cartridges for the second printer version so that such print cartridges use algorithm 2. So, this means that the print cartridges that use algorithm 2 can be used with either the first version of the printers or the second version because both the first and second versions of the printers understand algorithm 2. However, the older print cartridges that were manufactured for the first version of the printers cannot be used on the second version of the printers because the second version of the printers do not understand algorithm 1. So, what in effect happens is that customers who purchased the first version of the printer will be able to continue to buy and use print cartridges, and even though such print cartridges may use algorithm 2 instead of algorithm 1, their first version printer will still work satisfactorily with algorithm 2 print cartridges.

The idea is that the print cartridges that were manufactured in the first year with the algorithm 1 will get used up over time during the first year, and so there will not be too many situations where a customer is going to buy a second version printer and try to use a first version print cartridge with it. What this technique provides is effectively to change the decryption/decoding algorithm after about a year, or at least after one version of the printer, so that even if the cloner/counterfeiter cracks algorithm 1, the cloner/counterfeiter is now going to have to go through the same reverse-engineering process all over again to crack algorithm 2. Accordingly, if the new printer versions are introduced, say at intervals that coincide with how long it takes the cloners/counterfeiters to crack the code for an encryption/encoding algorithm, then the cloner/counterfeiter is always behind the printer manufacturer (e.g., by the time the cloner/counterfeiter cracks the code for one printer version, the printer manufacturer has moved on to the second version, and so the cloner/counterfeiter has to start all over again), and the counterfeiter/cloner has not made any significant profit because by the time the counterfeiter/cloner cracked the code for the first version, there is not as much of a market for the first-version cartridges.

Alternatively or additionally to the above-described indicators, there may be one or more other indicators 1210 that can be provided to and used by the first apparatus 102.

In some embodiments, any one or more of the above-specified techniques can be combined with any of the other techniques to make a custom encryption/encoding algorithm.

To further illustrate features of various example embodiments, a description is provided herewith in the context of a print cartridge and printer: A lower-end ink-jet printer causes the print head to heat up to a temperature (e.g., approximately 50 degrees Celsius) that is suitable to evaporate the ink that is in the print nozzle so that the print head can spray the evaporated ink onto a print medium (e.g., paper) to print text or graphics. The print head, which is onboard the print cartridge, may include a temperature-sensing device, such as a resistor, to indicate the print head temperature to the printer (for example, the temperature-sensing device may be included in a print head integrated circuit chip that is attached to or integral with the print head). Therefore, the printer may cause the print head to commence printing when this resistor has a resistance that indicates that the print head has reached a suitable temperature for printing. Because the range of suitable printing temperatures may be relatively narrow, the printer should obtain an accurate indication of the print head temperature.

Therefore, the manufacturer of the print head and its associated chip typically tests and calibrates the temperature-sensing device relative to temperature, and stores in an EPROM (e.g., the storage unit 210 in FIG. 2) on the print cartridge a value generated by the temperature-sensing device when the print-head temperature is at a specified value. The EPROM may be part of a print cartridge or print head chip that is disposed on the print cartridge.

For example, suppose that a temperature-sensing resistor on a print head chip is designed to have a resistance of 150.0 ohms when the print head is at a suitable printing temperature, such as 50 degrees Celsius. However, due to manufacturing process variations and other issues, the actual value of the temperature-sense resistor when the temperature of the print head is at the desired printing temperature may vary, for example, by ±5% from print-head chip to print-head chip. In the present example, ±5% corresponds to a range of approximately 150.0±8.0 ohms.

Therefore, during the testing of the print head chip, the manufacturer heats the print-head to the print temperature (e.g., 50 degrees Celsius), measures the actual value (e.g., 147.4 ohms) of the temperature-sense device (e.g., resistor) at the print temperature, and stores this measured value in the EPROM on board the print cartridge. The stored value may be encrypted/encoded or non-encrypted/un-encoded. During operation of a printer in which an ink cartridge with such a print head chip is installed, the printer of one embodiment causes the print head to heat up, monitors the value of the temperature-sense device, and periodically compares the monitored value with the value stored in the EPROM. When the monitored value equals the stored value, the printer determines that printing may commence.

Other values that the manufacturer of the print head and/or chip assembly may store in the on-board EPROM, for reasons other than or in addition to counterfeiting/cloning deterrence, may include the relative location from which the print-head-chip die was scribed from a wafer. Thus, information such as the print head chip die location and the value generated by a temperature-sensing device at the printing temperature may already be stored on the print head chip for reasons other than counterfeiting/cloning deterrence, and therefore the use of these values for counterfeiting/cloning deterrence would not require significant additional designs/modifications in the print cartridge and printer to implement. Furthermore, although counterfeiters/cloners may be able to reverse engineer this information, as discussed below, an embodiment may use this information to allow a printer to distinguish between authentic and non-authentic print cartridges in a manner that is difficult for a counterfeiter/cloner to reverse engineer.

In an embodiment, the manufacturer of the print head may select one or more values of this stored information (e.g., the print temperature and the die location) from a print head chip, and apply to these values an encryption/coding algorithm that creates a code value for the print head chip. If the selected values are typically different from print head chip to print head chip, then this use of the value(s) may make the encryption/coding more robust because the algorithm may generate a different code value for each print head chip.

In an embodiment, the printer then applies the same selected values and the code value to a corresponding decryption/decoding algorithm, and compares the result of the decoding algorithm to a reference result that may be stored on the printer. If the result equals the reference result, then the printer determines that the print cartridge is authentic and allows the printer to operate normally. However, if the result does not equal the reference result, then the printer determines that the print cartridge is not authentic, and may disable the printer and generate an error message.

In another embodiment, the coding and decoding algorithms may generate an offset, which if added to an existing stored value, gives a proper value for use by the printer. For example, the coding algorithm may generate from the die-location and print-temperature values a temperature-offset value. Next, the manufacturer combines (e.g., adds, subtracts, etc.) the temperature-offset value and the measured print-temperature value to generate a combined temperature value, which the manufacturer stores on the print-cartridge cartridge as the code value in place of the measured print-temperature value.

When the print cartridge is installed in the printer, the printer applies a decryption/decoding algorithm to the die-location and coded values to recover the offset value, and recovers the measured print-temperature value from the coded and offset values. So for example, if the coded value is 135 ohms and the correctly recovered offset value is 15.2 ohms, then the printer may sum these values to recover a measured-temperature value of 150.2 ohms, and cause the printer to print when the temperature-sensing resistor has a resistance of 150.2 ohms.

If the recovered measured-temperature value is incorrect, then the printer may be unable to print properly, and may generate an error message that the problem may be due to the installation of a non-authentic print cartridge. In an embodiment, the coding and decoding algorithms may be selected such that for non-authentic chips that merely store the measured-temperature value, and not a coded value that is the result of a combination of the measured-temperature value and an offset, the erroneous recovered offset value may be out of a reference range. Therefore, the printer may determine just from the erroneous offset value being out of the reference range that the print cartridge is non-authentic.

Therefore, in the above-described embodiments, even though a counterfeiter/cloner may be able to reverse engineer the stored values used to generate the code value, it may be more difficult to impossible to reverse engineer the coding and decoding algorithms, at least not within the life cycle of the printer version at issue.

To further describe still another embodiment in the context of a print cartridge and a printer, a print head manufacturer may generate a code value using an algorithm and values (such as a chip ID, resistance value, etc.) that are stored on the print-head chip. The algorithm may not be stored on the chip, and the code value may or may not be stored on the chip. For example, the code value may be an offset that is combined with a chip value that would otherwise be stored on the chip, and this code value is instead stored on the chip in place of the chip value.

The print-head manufacturer then forms the print-head assemblies that include the print-head and the print-cartridge chip. The print-cartridge manufacturer then tests the print heads in a conventional manner, including checking that the EPROMs are programmed with some values in certain locations and refreshing these values if needed.

When the print cartridge is installed in a printer, a chip (e.g., a processor) on the printer applies a decryption/ decoding algorithm to the appropriate values stored on the print-head chip and compares the result to a reference result stored on the printer. If the result matches the reference result, then the printer chip determines that the print cartridge is authentic and enables the printer for normal operation. The printer chip may also alter one of the stored values before using it; for example, the printer may add an offset to a stored value and use the sum as a value, such as the resistance of a temperature-sense resistor that corresponds to a print temperature.

If the result does not match the reference result, then the printer chip determines that the print cartridge is non-authentic, disables the printer from printing, and generates an error message indicating to an operator that the print cartridge is non-authentic and that an authentic ink cartridge should be installed in order for the printer to operate normally. In other embodiments, the printer chip may just cause the printer to operate improperly, and leave it to the operator to determine whether the cause is a non-authentic print cartridge or provide a message that states that the cause of the improper operation may be a non-authentic print cartridge.

In other embodiments, instead of coding and decoding values of information stored on the print-head chip for other reasons, one may code and decode values stored solely for counterfeit/clone prevention.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments, including what is described in the Abstract, is not intended to be exhaustive or to limit the embodiments to the precise forms disclosed. While specific embodiments are described herein for illustrative purposes, various equivalent modifications are possible. For example, in some embodiments, rather than using the full string of binary bits of a particular parameter value for the encryption/encoding inputs, less than all of the bit values may be used as the inputs in order to generate the code value(s). As another example, for instance with a cellular telephone, a user may manually enter a code via the telephone's keypad, in order to have the phone determine whether the entered code (for a battery) matches with a code that the telephone expects to receive. These and other modifications can be made in light of the above detailed description.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. A replaceable component, comprising:
   a plurality of physical parameters, each physical parameter having a determinable value;
   a code value that is based on the determinable values of the plurality of physical parameters and on a selected encryption algorithm;
   a storage unit to store the code value, wherein the code value is usable to determine whether the replacement component is authentic; and
   wherein the storage unit stores at least one indicator that is distinct from the code value, the at least one indicator providing information as to which of a plurality of algorithms should be selected and applied to determine whether the replaceable component is authentic, and which of the plurality of physical parameters should be utilized in generating an input for the selected encryption algorithm and which of the plurality of physical parameters should be utilized in generating a key for the selected encryption algorithm.

2. The replaceable component of claim 1 wherein the storage unit includes a memory in an integrated circuit that is disposed on the replaceable component.

3. The replaceable component of claim 2 wherein the at least one parameter includes an electrical parameter of an element in the integrated circuit.

4. The replaceable component of claim 2 wherein the at least one parameter includes a characteristic of an element of the replaceable component that is outside of the integrated circuit.

5. The replaceable component of claim 1 wherein the storage unit includes a barcode or RFID tag.

6. The replaceable component of claim 1 wherein the code value is the determinable value without translation.

7. The replaceable component of claim 1 wherein the code value is an encoded representation of the determinable value.

8. The replaceable component of claim 7 wherein the encoded representation is based on a selected one of the encryption algorithms that uses the determinable value of the at least one parameter for either or both a key input and a plaintext input to generate a ciphertext output, and wherein the ciphertext output is usable as the code value.

9. The replaceable component of claim 1 wherein the at least one indicator includes a lookup table that determines based on a value of the at least one indicator which of the plurality of algorithms to utilize, which of the at least one parameter to utilize in providing plaintext input to the plurality of algorithms being utilized, and which of the at least one parameter to utilize in providing a key to the plurality of algorithms being utilized.

10. The replaceable component of claim 1 wherein the stored code value is usable to compare with a reference code value to determine a match, and wherein the replacement component is determined to be authentic in response to existence of the match.

11. The replaceable component of claim 1 wherein the replaceable component is configurable to be installed in a host device, and which respectively include: a print cartridge and a printer; a lense and a camera, a battery and a telephone, a remote control and a television, a peripheral and a computer, or an automobile part and an automobile.

12. The replaceable component of claim 1 wherein the determinable value is stored in the storage unit.

13. A host device, comprising:
an interface to receive a replacement component;
a unit that uses a plurality of code values and an indicator value stored in the replacement component to determine whether the replacement component is authentic, each of the plurality of code values being distinct from the indicator value and each code value being based on a physical parameter of the replacement component;
wherein the stored indicator value determines which of a plurality of encryption algorithms to utilize in authenticating the replacement component and which of the plurality of code values are to be utilized as plaintext input to the encryption algorithm being utilized and which of the plurality of code values are to be utilized in determining the key of the encryption algorithm being utilized.

14. The host device of claim 13 wherein the host device and the replaceable component respectively include: a printer and a print cartridge; a camera and a lense, a telephone and a battery, a television and a remote control, a computer and a peripheral, or an automobile and an automobile part.

15. The host device of claim 13 wherein to determine whether the replacement component is authentic, the unit is configured to determine a value of at least one physical parameter, translate the determined value to a reference code value, and compare the reference code value with the stored code value, and wherein the replacement component is deemed to be authentic if the stored code value and the reference value match.

16. The host device of claim 13 wherein to determine whether the replacement component is authentic, the unit is configured to compare a reference code value with the stored code value, and wherein the replacement component is deemed to be authentic if the stored code value and the reference value match.

17. The host device of claim 13 wherein to determine whether the replacement component is authentic, the unit is configured to decode the stored code value and compare the decoded value with a reference value, and wherein the replacement component is deemed to be authentic if the decoded value and the reference value match.

18. A method, comprising:
determining values of a plurality of physical parameters of a replaceable component;
translating the determined values of the physical parameters into a code value;
storing the code value in the replaceable component to enable a host device to use the stored code value to determine whether the replaceable component is authentic; and
wherein translating the determined values of the parameters into a code value includes,
determining an indicator value stored in the replaceable component and using the determined indicator value in,
selecting one or more encryption algorithms from among a plurality of encryption algorithms, the number of selected encryption algorithms being fewer than the total number of encryption algorithms and each encryption algorithm receiving plaintext input and key input,
selecting at least one of the determined physical parameters to be used in providing the plaintext input to each selected encryption algorithm, and
selecting at least one of the determined physical parameters to be used in providing the key input to each selected encryption algorithm;
wherein the indicator value is based upon a die location indicator, a geographic indicator, a version indicator, a date indicator, or a condition indicator.

19. The method of claim 18 wherein code values of plural ones of the replacement component are different one component to another component, in view of variations in values of the at least one parameter.

20. A method, comprising:
reading, by a host device, a code value stored on a replaceable component, wherein the stored code value represents a value of at least one physical parameter of the replaceable component; and
determining, by the host device, that the replacement component is authentic, by matching a reference value to the code value;

wherein the reference value is based on a plurality of physical parameters of the replaceable component and a selected one of a plurality of encryption algorithms; and wherein matching the reference value to the code value includes determining which of the plurality of physical parameters should be utilized in generating plaintext input for the selected encryption algorithm and which of the plurality of physical parameters should be utilized in generating a key for the selected encryption algorithm.

21. A system, comprising:

a replaceable component that includes a stored code value that is based on a plurality of physical parameters of the replaceable component, wherein the replaceable component stores an indicator that provides information as to which of the plurality of physical parameters and which of a plurality of encryption algorithms should be applied to determine whether the replaceable component is authentic, each encryption algorithm receiving a key input and plaintext input, the plaintext input based on a digitized value of a resistance physical parameter of a component in the replaceable component, wherein the digitized value is calculated using a look-up table for converting a measured value of the resistance physical parameter to the digitized value and the key input based on one of a resistance physical parameter, a transistor physical parameter, and a value of a bit stored in memory of the replaceable component; and a host device configured to receive the replacement component, the host device being further configured to use the stored code value and stored indicator to determine whether the replacement component is authentic.

22. The system of claim 21 wherein to determine whether the replacement component is authentic, the host device is configured to determine a value of the at least one physical parameter, translate the determined value to a reference code value, and compare the reference code value with the stored code value, and wherein the replacement component is deemed to be authentic if the stored code value and the reference value match.

23. The system of claim 21 wherein to determine whether the replacement component is authentic, the host device is configured to decode the stored code value and compare the decoded value with a reference value, and wherein the replacement component is deemed to be authentic if the decoded value and the reference value match.

24. The system of claim 21, wherein the look-up table for converting the measured value of the resistance physical parameter to the digitized value includes a plurality of resistance ranges, and wherein a digitized value is associated with each of the plurality of resistance ranges.

25. The system of claim 21, wherein the look-up table for converting the measured value of the resistance physical parameter to the digitized value includes a plurality of resistance values, each resistance value being associated with a randomized digitized value in the look-up table.

* * * * *